United States Patent [19]
Callahan et al.

[11] Patent Number: 6,057,061
[45] Date of Patent: *May 2, 2000

[54] ETHYLENE-VINYL ALCOHOL COPOLYMER BATTERY SEPARATOR

[75] Inventors: Robert W. Callahan, Charlotte, N.C.; Hongkyu Kim, Providence, N.J.

[73] Assignee: Celgard Inc., Charlotte, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/969,235

[22] Filed: Nov. 13, 1997

[51] Int. Cl.[7] ..................................................... H01M 2/16
[52] U.S. Cl. .......................... 429/249; 429/254; 429/249; 429/129; 429/151
[58] Field of Search .................................. 429/254, 249, 429/129, 251

[56] References Cited

U.S. PATENT DOCUMENTS

| | | | |
|---|---|---|---|
| 3,870,593 | 3/1975 | Elton et al. | 161/159 |
| 4,309,494 | 1/1982 | Stockel | 429/254 |
| 5,256,351 | 10/1993 | Lustig et al. | 264/22 |

FOREIGN PATENT DOCUMENTS

WO 97/20885  6/1997  WIPO .................................. C08J 9/28

*Primary Examiner*—Maria Nuzzolillo
*Assistant Examiner*—Mark Ruthkosky
*Attorney, Agent, or Firm*—Robert H. Hammer III

[57] ABSTRACT

The present invention is directed to a battery separator being an oriented microporous film containing ethylene vinyl alcohol copolymer with a filler, and a battery containing that separator.

4 Claims, No Drawings

ETHYLENE-VINYL ALCOHOL COPOLYMER BATTERY SEPARATOR

FIELD OF THE INVENTION

The present invention is directed to a battery separator comprising an oriented ethylene-vinyl alcohol copolymer microporous membrane.

BACKGROUND OF THE INVENTION

A battery is an electrochemical device that generates electric current by converting chemical energy to electrical energy. Its essential components are: positive and negative electrodes made of more or less electrically conductive materials; a separating medium (e.g., a separator); and an electrolyte. There are several types of batteries. Two types of batteries are: primary (or non-reversible or disposable), and secondary (or reversible or rechargeable). Another way of characterizing batteries is by the nature of the electrolyte; for example, the electrolyte may be aqueous or non-aqueous (e.g., organic). The nature of the electrolyte can have a material impact on the selection of the separator.

Batteries with aqueous electrolytes include, but are not limited to: alkaline batteries, nickel metal hydride (NiMH) batteries; nickel cadmium (NiCd) batteries; and zinc-air batteries. Separators for these batteries must be hydrophilic. Hydrophilic refers to the ability to 'wet out' the electrolyte. 'Wet-out' refers to the ability to cause a materials (e.g., electrolyte) to penetrate more easily into, or spread over the surface of another material (e.g., separator).

In primary, aqueous electrolyte batteries, nylon and hydrophilically-treated polyolefin separators may be used. Nylon is an inherently hydrophilic material, and polyolefin, an inherently hydrophobic material, must be treated with a wetting agent prior to use to render it hydrophilic.

In secondary, aqueous electrolyte batteries, nylon and hydrophilically treated polyolefin separators have been used, but both are deficient because they degrade (i.e., the nylon or the hydrophilic treatment on the polyolefin) over the life of the rechargeable battery. The degradation can shorten the life of that battery.

Accordingly, there is a need for a new battery separator that is hydrophilic and resists degradation.

U.S. Pat. No. 4,309,494 discloses a battery separator made from an ethylene vinyl alcohol (or EVOH) copolymer, but this separator is made by a solvent extraction process, or by a swelling, in the presence of the electrolyte, of the nonporous membrane and is not oriented. U.S. Pat. No. 5,238,735 discloses a battery separator made from a polyolefin by a particle stretch technique. In the particle stretch technique, synthetic resin particles are added to the polyolefin, so that when the nonporous film is stretched, 'peeling' will be induced at the interface of the particles and polyolefin to create pores. Japanese Kokai 56/049157 discloses an ethylene vinyl alcohol copolymer porous film for blood-plasma separation made by a solvent extraction process and not by an orientation process. WO97/20885 discloses a microporous ethylene-vinyl alcohol copolymer membrane that may be used as a separator. The membrane is made by a 'phase separation' technique. In the phase separation technique, the EVOH copolymer is dissolved into a compatible polymer or compound, and the non-EVOH material is removed. Phase separation is not orientation.

Accordingly, there is a need for a new battery separator that is permanently hydrophilic, resists degradation, and is simply and economically produced.

SUMMARY OF THE INVENTION

The present invention is directed to a battery separator being an oriented microporous film containing ethylene vinyl alcohol copolymer and a battery containing that separator.

DESCRIPTION OF THE INVENTION

A battery is an electrochemical device that generates electric current by converting chemical energy to electrical energy. Its essential components are: positive and negative electrodes made of more or less electrically conductive materials; a separator; and an electrolyte. Batteries may be either primary (non-reversible or disposable) or secondary (reversible or rechargeable). The electrolyte may be aqueous or non-aqueous. In the present invention, the preferred battery is an aqueous secondary battery. Specifically, this battery may be referred to as an alkaline secondary battery. Examples of this battery include: nickel metal hydride (NiMH); nickel cadmium (NiCd); and zinc-air.

A battery separator is a microporous sheet or film that is placed between the positive and negative electrodes and is wetted with the electrolyte. In aqueous electrolyte batteries, it is preferred that the separator be hydrophilic, so that the electrolyte wets out on the separator. In the present invention the separator is made hydrophilic by the use of an ethylene vinyl alcohol copolymer. The separator should be as thin as possible; it may have a thickness ranging from 5 to 200 microns.

Oriented microporous film refers to a microporous film suitable for use as a battery separator and that may be made by a particle stretch technique. In the particle stretch technique, inert fillers (i.e., particles) are added to the ehtylene vinyl alcohol copolymer, so that when the nonporous precursor film is stretched, micropores will be created at the interface of the particles and the copolymer. Stretching may be uniaxial or biaxial, the latter is preferred. No solvent is used to extract the particles. The particle stretch technique is described in greater detail below. The microporous film suitable for use as a battery separator preferrably has a Gurley value (TAPPI T-536, high pressure method) ranging from less than 10 to 100; a pore size ranging from 1 to 10 microns; and a porosity ranging from 30 to 80%.

Ethylene vinyl alcohol copolymer is, at least, a polymer consisting of ethylene and vinyl alcohol monomers (other monomers, as is well known, may be used). The preferred ethylene vinyl alcohol copolymer consists of about 27 to 49 mole % ethylene. The most preferred ethylene vinyl copolymer consists of about 29 mole % ethylene.

Inert filler refers to particles added to the copolymer that are used to facilitate pore formation during stretching and that does not adversely affect the battery chemistry. The fillers may be either organic or inorganic. Exemplary inorganic fillers include: glass particles, and ceramic particles. Exemplary organic fillers include: polytetraflouroethylene (PTFE), and a variety of cured rubber particles. The filler's average particle size may be in the range of 400 to 800 nanometers, and preferably in the range of 550 to 650 nanometers.

The battery separator is produced by blending a composition of ethylene vinyl alcohol copolymer from 60 to 80 volume percent with from 40 to 20 volume percent of inert filler. The composition is formed into a film, and the film is molecularly oriented by hot stretching. Exemplary film forming techniques include casting and extrusion, extrusion being preferred. The pores of the microporous film are formed by a 'particle-stretch' techniques, i.e., induced by stretching the ethylene-vinyl alcohol copolymer containing an inert filler. To achieve uniform-pores (i.e, shape and size of the pore and distribution of pores in film), the stretch ratio and the uniform dispersion of filler in the copolymer are important. It is not always necessary to stretch the article in two directions, and monoaxial stretching alone may give a film having sufficiently good properties. The stretch ratio is generally 0.5 to 4, preferably 2 to 3. The stretching temperature is in the range from about 80° C. to 170° C., preferably in the range of about 115° C. to 150° C.

With regard to uniform dispersion of filler, the mixing of the components may be performed by using any known mixing method. For example, the above components may be simultaneously mixed by using a mixer such as a 'supermixer', or a Henschel mixer, or in an extruder.

The type of apparatus suitable for preparing the films of this invention are well known in the art. For example, a conventional screw extruder equipped with a die is satisfactory. The copolymer with filler is introduced into a hopper of the extruder. The resin is melted and transferred by the screw to the die from which is extruded through a slot in the form of a film from which it is drawn by a take-up or casting roll.

The melt temperature for film extrusion is, in general, no higher than about 10–20° C. above the melting point of the ethylene vinyl alcohol copolymer and no lower than the melting temperature. A temperature of 5° C. to about 10° C. above the copolymer's melting temperature is preferable.

Ethylene vinyl alcohol copolymer battery separators, as disclosed above, were made in the following manner.

EXAMPLE 1

A mixture of 63 volume percent pelletized ethylene vinyl alcohol copolymer sold by EVALCA of Lisle, Ill. under the name of EVAL@F101 (32 mole percent ethylene content) and 37 volume percent of pelletized filler sold by Rohm & Haas of Philadelphia, Pa. under the name of Paraloid EXL 3330, was compounded in a 40 mm ZSK Werner Pfleiderer twin screw extruder and extruded in a strand/rod form. After grinding in a Wiley mill (or pelletizing using a pelletizer) and drying at about 100° C. for up to 8 hours, the composition was fed to the hopper of a ¾ inch Brabender single screw extruder which was operating at a speed of 76 rpm. Attached to the extruder was a 6 inch film die. The temperature profile which was progressively spaced along the length of the extruder from the feed end to the die end, and was 190, 220, 216, 205° C. The extruder composition was fed to a three casting set of s-rolls maintained at 90° C. The thickness of the composition was found to be approximately 16 mils. The unstretched film was biaxially stretched at 150° C. in a simultaneous mode using a T. M. Long film stretching equipment under constant force mode. The machine direction/transverse direction stretching ratio was 3.0/3.0. The resulting separator had acceptable electrical resistance and was found to have desirable tensile strength and pore volume.

EXAMPLE 2

A mixture of 80 volume percent powdered ethylene vinyl alcohol copolymer sold by Noltex L.L.C. of LaPorte, Tex. under the name of Soarnol@B-7 (29 mole percent ethylene content), and 20 volume percent of filler sold by Rohm & Haas under the name of Paraloid EXL 2330 was compounded in a Haake conical twin screw extruder and extruded in a strand/rod form.

After pelletizing and drying, the compound was fed to the hopper of a ¾ inch Brabender single screw extruder which was operating at a speed of 45 rpm. Attached to the extruder was a 4 inch film die. The temperature profile which was progressively spaced along the length of the extruder from the feed end to the die end, and was 190, 220, 216, 205° C. The extruder composition was fed to a three casting set of s-rolls maintained at 80° C. The thickness of the composition was found to be approximately 10 mils. The unstretched film was biaxially stretched at 125° C. in a simultaneous mode using a Brukner biaxial orientation machine. The machine direction/transverse direction stretching ratio was 1.5/2.0.

The resulting separator has acceptable electrical resistance and was found to have desirable tensile strength and pore volume.

The present invention may be embodied in other specific forms without departing from the spirit or essential attributes thereof, and, accordingly, reference should be made to the appended claims, rather than the foregoing specification as indicating the scope of the invention.

We claim:

1. A battery separator comprising: an oriented microporous film containing ethylene vinyl alcohol copolymer, said copolymer comprising about 27–49 mole % ethylene monomer, and an inert filler wherein said film comprises from 20 to 40 volume % of said filler, and said filler being selected from the group consisting of glass, ceramic, polytetrafluoroethylene, and rubber particles.

2. A battery comprising: a positive electrode; a negative electrode; an aqueous electrolyte; and a separator being in contact with said electrolyte and positioned between said electrodes, said separator comprising an oriented microporous film containing ethylene vinyl alcohol copolymer, said copolymer comprising about 27 to 49 mole % ethylene monomer and an inert filler wherein said film comprising from 20 to 40 volume % of said filler, and said filler is selected from the group consisting of glass, ceramic, polytetrafluoroethylene, and rubber particles.

3. The separator of claim 1 or 2 wherein said film is a biaxially oriented.

4. The separator of claim 1 or 2 further comprising an inert filler.

* * * * *